United States Patent
Takahashi et al.

(10) Patent No.: US 8,379,358 B2
(45) Date of Patent: Feb. 19, 2013

(54) MOTOR CONTROL CIRCUIT

(75) Inventors: Ryoichi Takahashi, Isesaki (JP);
Hiroshi Inoue, Oota (JP); Masatoshi Komada, Kyoto (JP)

(73) Assignee: Semiconductor Components Industries, LLC., Phoenix, AZ (US)

( * ) Notice: Subject to any disclaimer, the term of this patent is extended or adjusted under 35 U.S.C. 154(b) by 518 days.

(21) Appl. No.: 12/570,488

(22) Filed: Sep. 30, 2009

(65) Prior Publication Data
US 2010/0090636 A1    Apr. 15, 2010

(30) Foreign Application Priority Data
Sep. 30, 2008 (JP) ................... 2008-253404

(51) Int. Cl.
*H02H 3/08* (2006.01)

(52) U.S. Cl. .......... 361/93.1; 361/23; 361/25; 361/93.7; 361/93.6; 324/500; 324/510; 324/525; 324/523; 318/432; 318/434; 318/34

(58) Field of Classification Search .................... 318/34, 318/432, 434; 340/584; 361/23, 25, 103
See application file for complete search history.

(56) References Cited

U.S. PATENT DOCUMENTS

| | | | |
|---|---|---|---|
| 5,801,503 A * | 9/1998 | Kim et al. | 318/434 |
| 5,864,456 A * | 1/1999 | Connor | 361/93.7 |
| 6,313,593 B1 * | 11/2001 | Matsubara et al. | 318/434 |
| 7,173,386 B1 * | 2/2007 | Jeon | 318/53 |
| 8,063,589 B2 * | 11/2011 | Liu | 318/112 |
| 2004/0239271 A1 * | 12/2004 | Matsubara et al. | 318/434 |

* cited by examiner

*Primary Examiner* — Rita Leykin
(74) *Attorney, Agent, or Firm* — Westerman, Hattori, Daniels & Adrian, LLP

(57) ABSTRACT

A motor control circuit 1 for controlling driving of a plurality of motors is provided with a plurality of motor driver circuits 7 and 8 for controlling driving of the plurality of motors 3 and 4, a plurality of excess current detection circuits 39 and 40 each for detecting an excess current flowing through corresponding one of the plurality of motors 3 and 4 to determine which motor driver circuit among the plurality of motor driver circuits 7 and 7 caused the excess current. The motor control circuit further includes a nonvolatile memory 46 configured to receive detection results from the plurality of excess current detection circuits 39 and 40 and store information on which motor driver circuit among the plurality of motor driver circuits 7 and 8 caused the excess current.

13 Claims, 7 Drawing Sheets

MOTOR CONTROL CIRCUIT

This application claims priority under 35 U.S.C. §119 to Japanese Patent Application No. 2008-253404 filed on Sep. 30, 2008, the entire disclosure of which is incorporated herein by reference in its entirety.

BACKGROUND OF THE INVENTION

1. Field of the Invention

The preferred embodiments of the present invention relate to a motor control circuit for controlling revolutions of motors when driving the motors. More specifically, they relate to a motor driving controlling technology capable of storing information on abnormal conditions, such as, e.g., excess currents and/or overheating for the latter analysis, even after shutting off the power supply.

2. Description of the Related Art

The following description sets forth the inventors' knowledge of related art and problems therein and should not be construed as an admission of knowledge in the prior art.

When excess currents continuously flow through a motor for a long period of time, the coils may be burned off, or smoke and/or flames may be generated from the circuit.

In order to prevent these problems, in some conventional technologies, it was configured to shut down the operation of the motor when the electric current of the inverter circuit exceeded a predetermined value (see, e.g., Japanese Unexamined Laid-open Patent Publication No. H4-108491 (hereinafter referred to as "Patent Document 1")). In another attempt to prevent the problems, it was configured to provide a storage means for storing information on specific abnormal conditions and stop the operation of the motor to prevent repeated operations in the abnormal conditions when the number of occurrences of the specific abnormal conditions exceeded a predetermined number of times (see, e.g., Japanese Unexamined Laid-open Patent Publication No. 2001-327175 (hereinafter referred to as "Patent Document 2")).

The aforementioned Patent Document 1, however, was a technology configured to merely stop the operation of the motor when a specific abnormality occurred, and the Patent Document 2 was also a technology configured to merely stop the operation of the motor when the number of occurrences of specific abnormalities exceeded a predetermined number of times. Both of the aforementioned technologies merely focus on stopping the operations. In other words, they could stop the abnormal operation of the motor due to, e.g., excess currents, but could not determine causes of the abnormal operation.

Conventionally, the number of built-in motor drivers was one, and therefore it was possible to identify the abnormal driver which caused the abnormal operation when the abnormality occurred. In cases where there are a plurality of motor drivers, however, it was very difficult to identify the motor driver caused the abnormality. Furthermore, according to the structure in which the electric power supply is shut down when abnormalities occurred, there was a drawback that the detailed information on the abnormalities could not be saved for the latter analysis.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a motor control circuit for controlling a plurality of motors, which is capable of identifying a motor driver which caused abnormality among a plurality of motor drivers.

According to a first aspect of the present invention, the present invention provides a motor control circuit for controlling driving of a plurality of motors. The motor control circuit includes a plurality of motor driver circuits for controlling driving of the plurality of motors, and a plurality of excess current detection circuits each for detecting an excess current flowing through corresponding one of the plurality of motors to determine which motor driver circuit among the plurality of motor driver circuits caused the excess current. The motor control circuit further includes a memory configured to receive detection results from the plurality of excess current detection circuits and store information on which motor driver circuit among the plurality of motor driver circuits caused the excess current.

In the aforementioned motor control circuit, it is preferable to further include a plurality of current-voltage conversion circuits each for converting a current flowing through corresponding one of the plurality of motors to a voltage value. Furthermore, each of the plurality of excess current detection circuits is configured to compare corresponding one of a plurality of detection voltage values outputted from the plurality of current-voltage conversion circuits with a first reference voltage value to detect an excess current flowing through corresponding one of the plurality of motors to thereby detect which motor driver circuit caused the excess current.

Furthermore, in the aforementioned motor control circuit, it is preferable to further include a resistor which decreases in resistance value as a temperature thereof increases, an overheat detection circuit configured to detect overheating of the plurality of motors by comparing a second voltage obtained by passing a constant current through the resistor with a second reference voltage, and an order detecting circuit configured to receive detection results from the excess current detection circuits and the overheat detection circuit to thereby detect which detection result changed first. In this motor control circuit, the memory stores information on which motor driver caused the excess current or the overheating.

In the aforementioned motor control circuit, the detailed malfunction status can be grasped even if the electric power is shut down because of abnormalities, such as, e.g., excess current and/or overheating, allowing correct repairs and analysis of the abnormalities, which improves the reliability.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
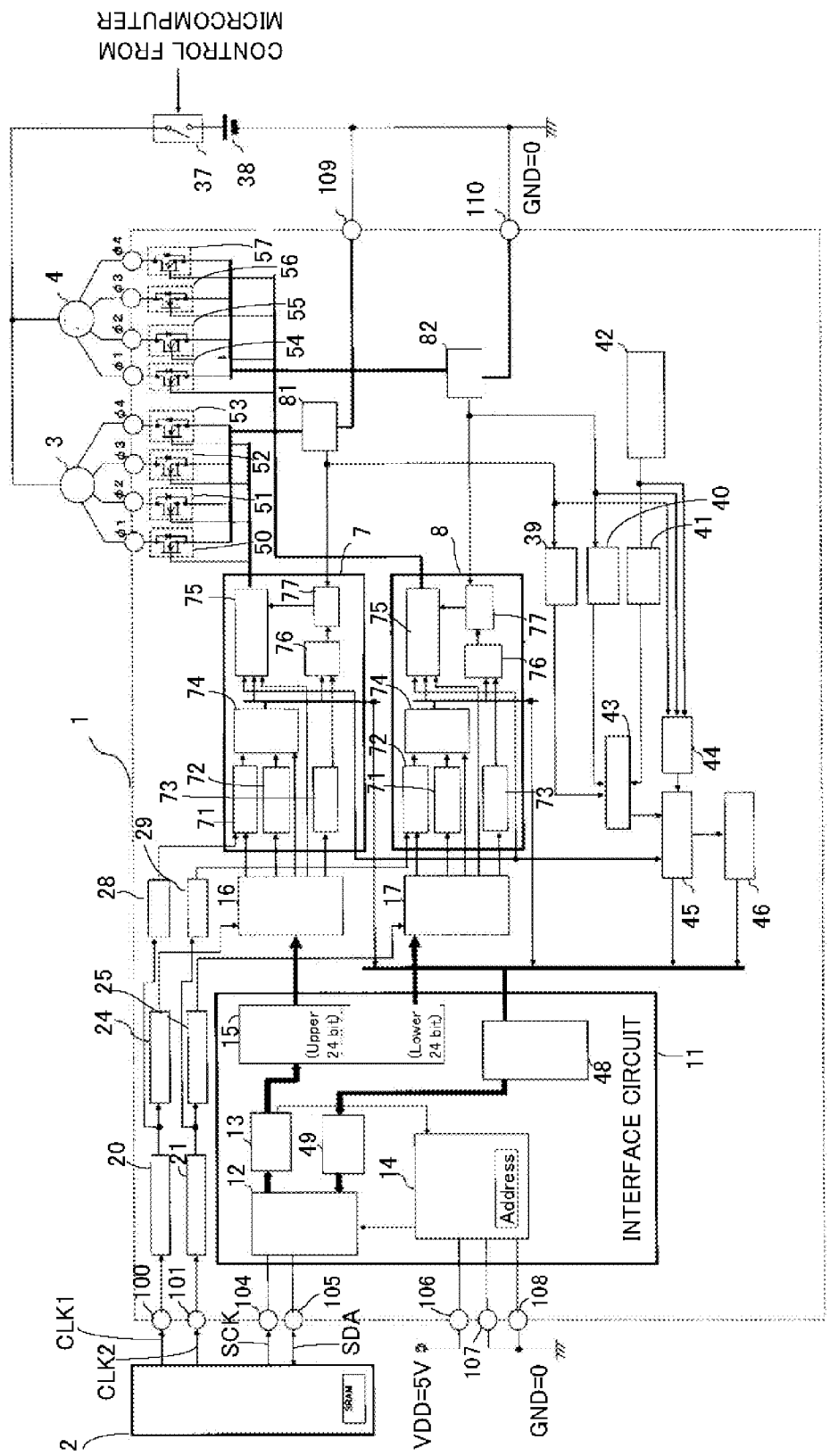
FIG. 1 is a block diagram showing a structure of a motor control circuit according to an embodiment of the present invention.

FIG. 1 is a block diagram showing a motor control circuit 1 for controlling two motors, i.e., a first motor 3 and a second motor 4, according to the present invention. The motor control circuit 1 is connected to a microcomputer 2 and controlled by the microcomputer 2. The microcomputer 2 is provided with a serial port so as to control other ICs using the serial port. In place of the serial port, a parallel port can be used. However, a parallel port requires many external terminals for communication, so it is realistically unsuitable.

A serial port is generally provided with a clock terminal and a data terminal synchronized with the clock terminal. Among them, an I²C bus is commonly used in many ICs and highly versatile. The following explanation will be directed to a case in which an I²C bus is used. A plurality of slave ICs can be connected to the I²C bus, and a master IC specifies the individually determined addresses of the slave ICs and communicates with the slave ICs to freely control the slave ICs.

The detailed specification of the I²C bus is a common matter and the details are disclosed in, e.g., home pages of Philips Corporations, so the explanation will be omitted here. Two signals used in the I²C bus are a serial clock signal (SCK) and a serial data (SDA). The serial clock signal (SCK) is applied from a terminal 104 and the serial data (SDA) is applied from a terminal 105. To initiate the communication, the master IC needs to specify the address of the slave IC to be selected by the communication. In this embodiment, the master IC corresponds to the microcomputer 2 and the slave IC corresponds to the motor control circuit 1.

The motor control circuit 1 includes two built-in driver circuits, i.e., a first driver circuit 7 which drives the first motor 3 and a second driver circuit 8 which drives the second motor 4. To control these two driver circuits 7 and 8 independently with a single I²C bus, there is no need to prepare two unique addresses assigned to each motor driver circuit. It is sufficient to prepare one unique address.

To set a unique address, in this embodiment, three address terminals, i.e., a terminal 106, a terminal 107, and a terminal 108, are provided, so that the lower three bits of seven bits of the unique address values assigned to the slave ICs setting with common I²C bus can be set from outside depending on the condition of the terminals. In this structure, up to eight ICs can be connected to the same I²C bus by changing the lower three bits. In cases where only one IC is connected or an external terminal cannot be used, it can be configured to refer to ROM data using an internal ROM.

Figure 2:
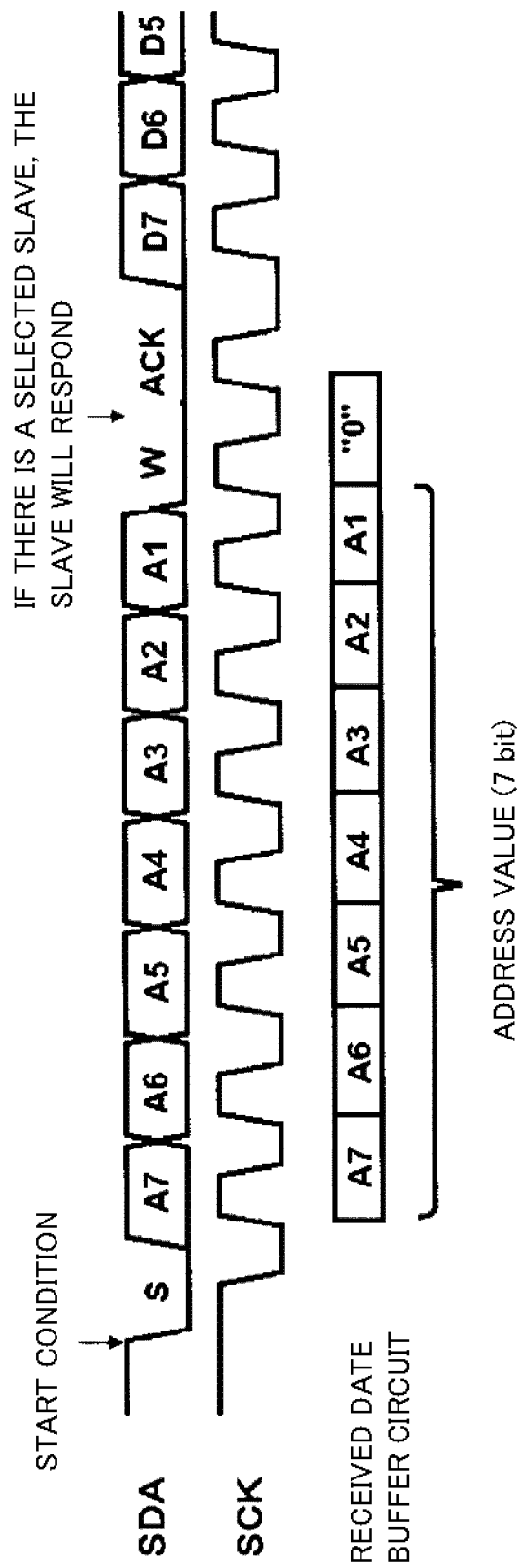
FIG. 2 is a timing chart showing the outline of the serial communication processing according to the embodiment.

As shown in FIG. 2, after a start condition is transmitted from the microcomputer 2 to initiate the communication with the I²C bus, a unique address value (7 bits) assigned to the slave IC is outputted in synchronization with the clock signal. The I²C bus control circuit 12 in the interface circuit 11 sends data (address) sent after the start condition to a received data buffer circuit 13. The received data buffer circuit 13 sends the stored data (address) to the address matching detection circuit 14.

The address matching detection circuit 14 previously stores an address value therein. When it is confirmed that the transmitted data (address value) are address values indicating the first motor 3 and the second motor 4, the data from the microcomputer 2 are sequentially allowed to be transmitted, which makes it possible to communicate with the motor control circuit 1.

The address matching detection circuit 14 can be configured to have two addresses, i.e., an address value of the first motor 3 and an address value of the second motor 4 so that it can detect the address matching of the first motor 3 and the second motor 4 individually, but not limited to it. That is, the address matching detection circuit 14 is not required to have two addresses, and can be configured to have only one address in which the first half 24 bits are assigned to the first motor 3 and the remaining half 24 bits are assigned to the second motor 4 among the memory showing the one address.

With this structure, there is no need to set a unique address to each of the motor driver circuits 7 and 8, and a single address can be set to an IC. Even in cases where there is a plurality of driver circuits, it is sufficient to prepare only one I²C bus address, which enables effective use of the address even if there is a limitation on the number of addresses for IC identification.

Conventionally, in the case of using two motor drivers, separate ICs are used, which naturally requires separate settings and therefore two addresses are required. In contrast, in this embodiment, even in cases where the number of built-in motor drives is increased, it is possible to cope with the increased number of built-in motor drivers by merely increasing the capacity of the register, which enables communication with a plurality of motors only using the address terminal of a single I²C bus. For example, even if there are eight ICs each having four motor drivers, it is not required to prepare 32 addresses, and it is sufficient to prepare the same number of addresses as the number of ICs.

In this embodiment, after the completion of communication for setting values of the two motor drivers, the microcomputer 2 sends a stop condition for terminating the data forwarding to the motor control circuit 1, and the settings for the first motor 3 and the second motor 4 are finished. During the data transfer, the received data buffer circuit 13 writes the received data into the received data storage register circuit 15 by 8-bit unit.

Each of the received data buffer circuit 13 and the received data storage register circuit 15 can be a register (memory device) constituted by a flip flop. The received data buffer circuit 13 and the received data storage register circuit 15 can be a memory, such as, e.g., a SRAM or a DRAM. In this case, however, the address management is required, which increases the IC chip area and complicates the system design. In contrast, in the case of a register, it stores data in a predetermined order, so no address management is required, which enables effective storage of required information.

Generally, significant changes of operating environments of a motor during the operation may cause troubles of the motor, and therefore the most recent setting values written in the received data storage register circuit 15 are not immediately reflected in the operating environments of the motors.

The most recent setting values of the motors will be reflected in the motor operation environments through the I$^2$C bus, after the completion of the data transfer by the stop condition by detecting the changes in the driving pulse signal using a driving pulse signal (CLK1) terminal 100 of a motor formed separately from the I$^2$C bus clock terminal (SCK) depending on the timing of the changes. The driving pulse signal (CLK1) for the motor applied from the terminal 100 is eliminated in pointed noises with a first shaping noise elimination circuit 20 and is applied to both the first rising detection circuit 24 and the first delay circuit 28.

The first raising detection circuit 24 detects changes in the driving pulse signal (CLK1) from the idle state. The first raising detection circuit 24 has a comparator and a counter therein, and is configured to determine that the motor is in an idle mode when there is no change in the driving pulse signal (CLK1) for a certain period, and thereafter notify the changes in the driving pulse, which is an input signal, to a first motor mode setting holding circuit 16 when it detects the changes. To the first motor mode setting holding circuit 16, in response to the signal from the first raising detection circuit 24, data stored in the received data storage register circuit 15 is directly transferred.

The first delay circuit 28 is configured to delay the driving pulse signal (CLK1). The first delay circuit 28 can be constituted by a basic delay circuit formed by combining a plurality of buffers since no significant delay such as one cycle delay or the like is required. A shift register can be used to cause further delay of the driving pulse signal (CKL1) when ample time is desired. While the driving pulse signal (CLK1) is delayed by the first delay circuit 28, the setting value of the first motor mode setting holding circuit 16 is reflected in the motor operating environments formed in the first driver circuit 7 for actually controlling the motor.

Figure 3:
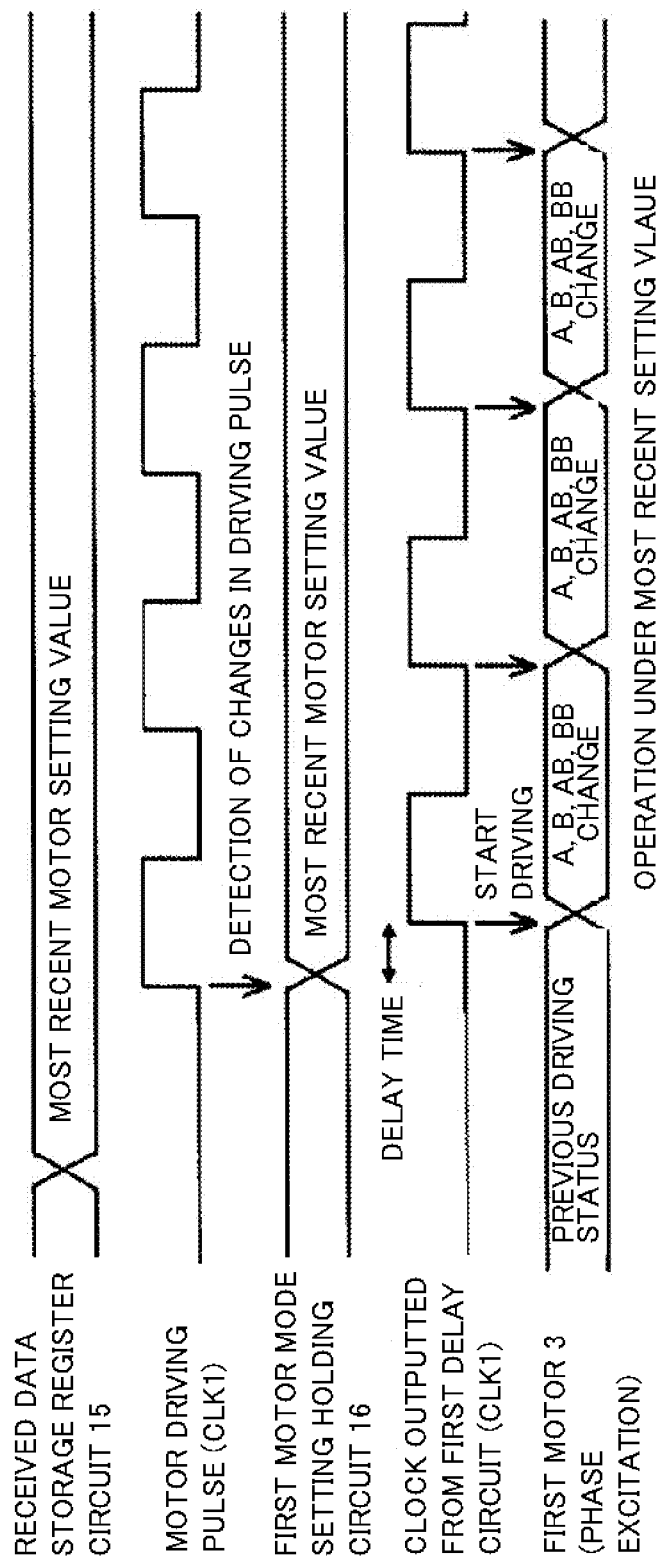
FIG. 3 is a timing chart at the time of updating the setting values of the motor according to the embodiment.

FIG. 3 shows a detailed timing chart in which the most recent setting value is reflected by the raising change of the motor driving pulse signal (CLK1) after the stop condition through the aforementioned I$^2$C bus. First, the most recent motor setting value is stored in the received data storage register circuit 15. Next, the raising changes of the motor driving pulse signal (CLK1) and the motor driving pulse signal (CLK2) are detected, and the most recent setting values stored in the received data storage register circuit 15 are written in the first motor mode setting holding circuit 16 and the second motor mode setting holding circuit 17 at the timing.

At that time, even if the most recent data is stored in the received data storage register circuit 15 after the stop condition, the operation reflecting the most recent setting value is not performed immediately. In the case of communication using a serial port, data are transmitted serially, and therefore the most recent setting value is not completed in a short period of time. It cannot always be updated at a definite timing since it takes time.

Under the circumstances, in order to set a timing reflecting the most recent setting value, the driving pulse signal (CLK1) is used. The driving pulse signal (CLK1) is set to an L level (idle state) for a certain period of time, and the most recent motor setting value will be reflected at the timing (restart timing) when the operation is initiated.

With this processing, the timing for reflecting the most recent setting value in the first motor 3 can be made clear. However, the driving pulse signal (CLK1) relates directly to the motor revolutions, and therefore, the contents of the first motor mode setting holding circuit 16 is switched, making it difficult to control the revolutions promptly. Therefore, a slight time difference is needed. To create the slight time difference, the first delay circuit 28 is required.

The point of the operation resides in that the most recent setting value is stored in the received data storage register circuit 15 using a serial port which relatively takes time and the timing for updating the setting value to the most recent setting value is decided utilizing a certain idle period of time of the driving pulse signal.

With the aforementioned procedure, it is possible to freely control the timing for updating the setting value of the first motor 3 to the most recent setting value from the microcomputer 2. The motor does not always change from an idle state to a rotating state. It is common to change the setting value while the motor is rotating. If the setting value of the counter is changed during the operation, malfunction may occur, which may cause discontinuous motor operation. For this reason, the driving pulse signal is made to a stopped state for a certain period of time, and it is the safest timing for a motor to update the setting value at a timing of initiating the next operation.

The received data storage register circuit 15 requires a storage capacity for the bit number required to control the motors. About 48 bits is the number of bits required to control the first motor 3 and the second motor 4. When the received data buffer circuit 13 transmitted data to the received data storage register circuit 15 six times if the data is 8-bit, the received data storage register circuit 15 will be filled with the data. In other words, after transmitting the data six times through the I$^2$C bus, it is necessary to transmit the stop condition to complete the data.

Furthermore, it is preferable that the received data storage register circuit 15 has a bit count which is the same as a total of the bit count of the first motor mode setting holding circuit 16 and that of the second motor mode setting holding circuit 17. If the bit count is the same as the total number of bit counts as mentioned above, it is not required to intervene an address decoder or the like, and thus, the structure can be simplified since it only requires direct forwarding to the same bit position.

Figure 4:
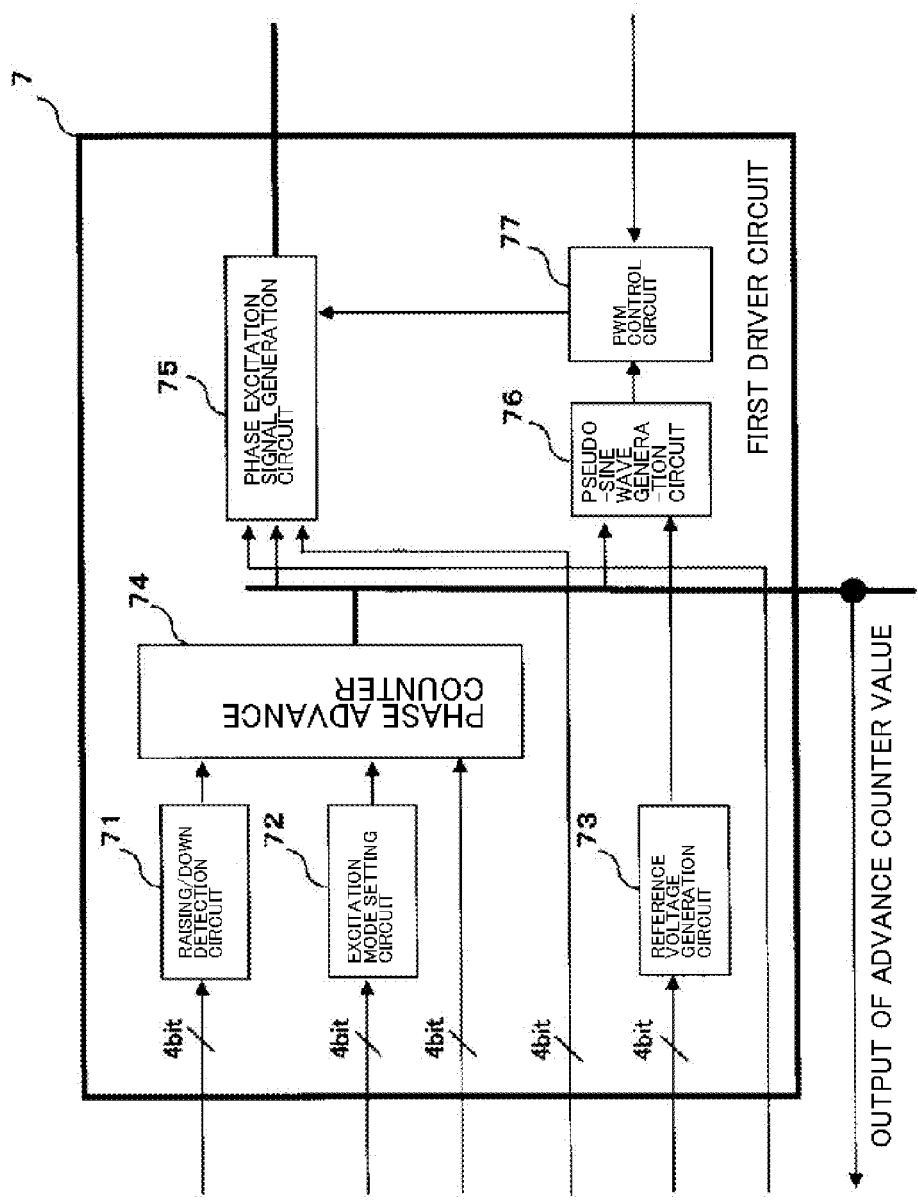
FIG. 4 is a block diagram showing a structure of a first driver circuit according to the embodiment.

FIG. 4 shows an inside of a block diagram of the first driver circuit 7. The first driver circuit 7 includes: a raising/down detection circuit 71 for detecting the raising/down of a clock signal for controlling the motor; an excitation mode setting circuit 72 for setting each excitation mode of motors; a reference voltage generation circuit 73 for generating a reference voltage to determine the electric current of the motor; a phase advance counter 74 that operates according to the detection results from the raising/down detection circuit 71 and the setting signal from the excitation mode setting circuit 72; a phase excitation signal generation circuit 75 for performing the switching control for transistors 50, 51, 52 and 53 which actually controls the first motor 3; a pseudo-sine wave generation circuit 76 that receives signals from the reference voltage generation circuit 73 and the phase advance counter 74 to generate a pseudo-sine wave; and a PWM control circuit 77 that receives a sine wave from the pseudo-sine wave generation circuit 76 to generate a PWM waveform according to the sine wave.

In the first motor mode setting holding circuit 16, in order, the first 4 bits ($1^{st}$ bit to $4^{th}$ bit) are used for setting the raising/down detection circuit 71, the next 4 bits ($5^{th}$ bit to $8^{th}$ bit) are used for setting the excitation mode setting circuit 72, the next 4 bits ($9^{th}$ bit to $12^{th}$ bit) are used for setting the phase advance counter 74, the next 4 bits ($13^{th}$ bit to $16^{th}$ bit) are used for setting the phase excitation signal generation circuit 75, and the next 4 bits ($17^{th}$ bit to $20^{th}$ bit) are used for setting the reference voltage generation circuit 73. The order of each bit can be matched to the operating environments of the first driver circuit. In the phase excitation generation circuit 75, signals required for the excitation mode is generated using the count value from the phase advance counter 74. By these series of settings, the motor control circuit 1 outputs the signals to the two-phase driving terminals φ1 (A), φ2 (AB), φ3 (B), and φ4 (BB) of the first motor 3.

Figure 5:
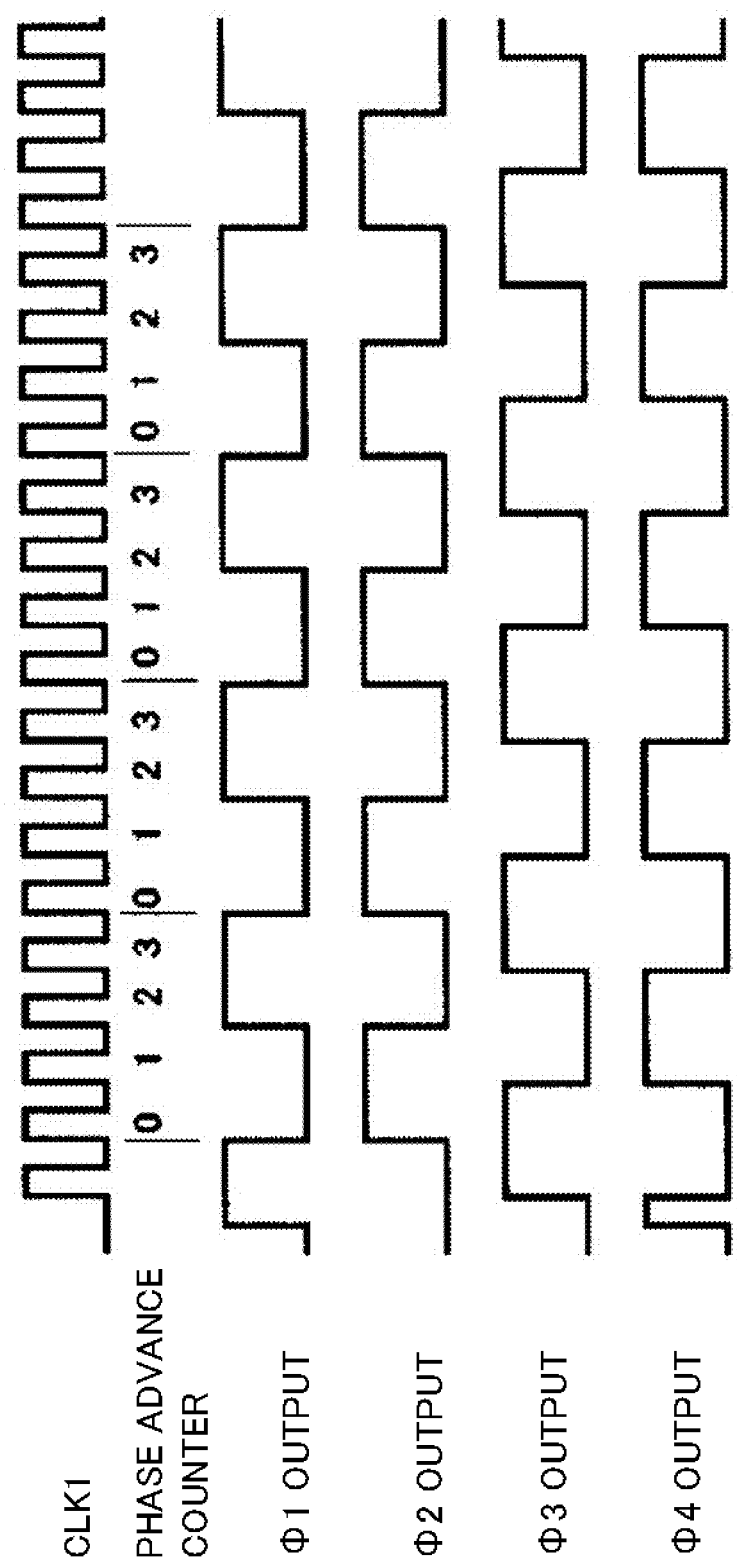
FIG. 5 is a timing chart in a two-phase excitation mode according to the embodiment.
Figure 6:
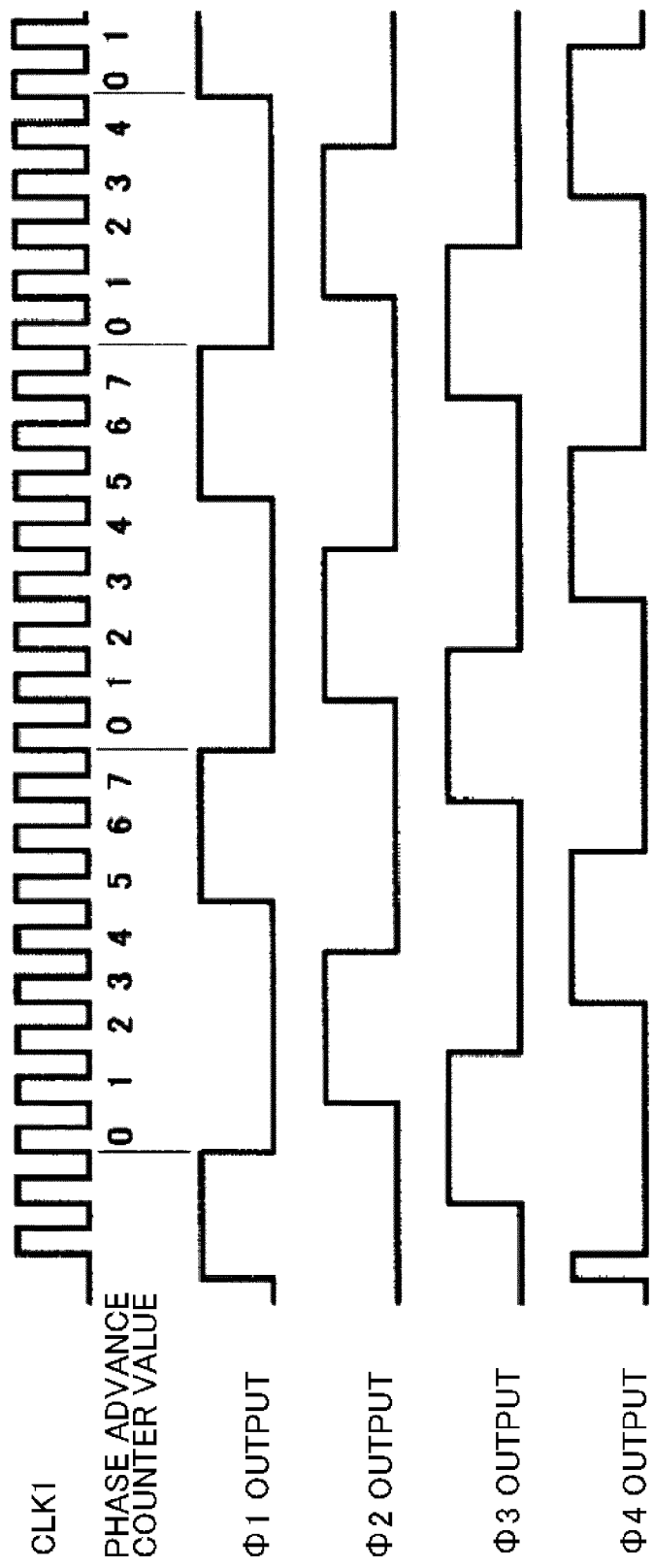
FIG. 6 is a timing chart in a single-two phase excitation mode according to the embodiment.

As a specific output example, FIG. 5 shows a timing chart of the two-phase excitation mode and FIG. 6 shows a timing chart of a single-two phase excitation mode. By the phase advance counter value from the phase excitation generation circuit 75, various motor excitation modes can be set arbitrarily.

The second motor 4 is controlled in the same manner as in the first motor 3, and therefore the explanation will be omitted here.

In the aforementioned embodiment, the explanation was directed to the case in which two-phase stepping motors are used. However, even in the case of a three-phase or a five-phase motor, the basic circuit structure is essentially the same as in the aforementioned embodiment except for the increased control transistors.

As shown in FIG. 1, a current-voltage conversion circuit (I-V conversion circuit) 81 is a circuit which converts the electric current flowing through the first motor 3 into a voltage and outputs the voltage. Similarly, a current-voltage conversion circuit ("I-V conversion circuit") 82 is a circuit which converts the electric current flowing through the second motor 4 into a voltage and outputs the voltage. The voltage outputted from the I-V conversion circuit 81 is applied to the excess current detection circuit 39 and the voltage outputted from the I-V conversion circuit 82 is applied to the excess current detection circuit 40. The excess current detection circuit 39 and the excess current detection circuit 40 each are a general excess current detection circuit having a comparator therein and configured to judge whether the amount of the electric current amount is abnormal by comparing the applied voltage with the reference voltage. The detailed structure of the excess current detection circuit will be omitted. The excess current detection circuit 39 and the excess current detection circuit 40 output the detection results to the control circuit 45. The control circuit 45 makes the nonvolatile memory 46 store the detection results.

It is preferable that the control circuit 45 adds data showing which of the electric currents of the first motor 3 and the second motor 4 had an excess current to the detection result when the control circuit 45 makes the nonvolatile memory 46 store the detection result. This facilitates measures for repairs and recurrence prevention. With these procedures, even if the power of the IC is shut down, the data indicating which motor had an excess current can be stored in the nonvolatile memory 46.

In addition to the size determination using the comparator, it can be configured such that analog values of voltages converted from the electric currents flowing through the first motor 3 and the second motor 4 using an A/D converter 44 are converted into digital values and that the digital values are outputted. In this case, if the aforementioned digital values are stored in the nonvolatile memory 46 periodically before abnormal conditions occur, the temporal alteration of the electric current can be detected, and therefore it becomes possible to detect whether the electric current increased rapidly or increased gradually.

An IC can be damaged not only by excess currents but also by overheating. In this case, by using a resistor which changes the resistance value according to the temperature, the temperature changes of the IC can be detected. Thus, a thermistor 42 is used as the resistor through which an electric current flows, which enables detection of the temperature changes of the IC. Although a thermistor is commonly used, in place of the thermistor, a bandgap element can also be used. The electric potential outputted from the thermistor 42 is outputted to the overheat detection circuit 41.

The overheat detection circuit 41 is a commonly used overheat detection circuit, and the detailed structure of the overheat detection circuit 41 will be omitted. The overheat detection circuit 41 has a comparator therein, and is configured to determine whether there are abnormalities in the temperature of the IC by comparing the voltage with the reference voltage, and in the same manner as in case of detecting the excess currents, the overheat detection circuit 41 shuts off the electric current.

The detection result of the overheat detection circuit 41 is outputted to the control circuit 45. The control circuit 45 outputs the detection result on overheating to the nonvolatile memory 46, in the same manner as in the case of detecting the excess currents. In the same manner as in the case of detecting the excess currents, if the detection result is periodically stored in the nonvolatile memory 46 as a digital value using an A/D converter 44, the temporal changes can be detected before the occurrence of abnormalities. With this, it is possible to detect whether the heat increased suddenly or gradually.

The motor control circuit 1 includes an order detection circuit 43 configured to detect which detection signal was received first from the excess current detection circuit 39, the excess current detection circuit 40, and the overheat detection circuit 41. The order detection circuit 43 can determine which abnormalities, excess current or overheating, occurred first. The information obtained by the order detection circuit 43 is outputted to the control circuit 45, and the control circuit 45 stores the information in the nonvolatile memory 46. Excess current and overheating are correlated, and thus, changes are not limited to either one. When excess current occurs, overheating occurs in a slightly delayed manner. When overheating occurs, excess current occurs in a slightly delayed manner. When there is only a short time difference, it is difficult to find out which was detected first. Therefore, the order detection circuit 43 is used to monitor which signal became active first using a system clock signal, and the monitoring result is held and stored in the nonvolatile memory 46. By storing the counter value of the phase advance counter 74 shown in FIG. 4 in the nonvolatile memory 46, the details of the motor can be grasped.

With the aforementioned structure, the information on "when", "in what condition", and "in which order" abnormalities occurred can be obtained. When abnormal conditions are detected, it is possible to prevent damages to the IC by shutting off the electric current. By shutting off the electric current, the electric power source is shut off, and thus, the continuation of the abnormal condition is terminated. Thus, the aforementioned problem can be solved.

The best mode of carrying out the invention was explained above, but the embodiments explained above are used only for explanatory purposes and the present invention should not be limited to them. The present invention allows various design-changes falling within the claimed scope of the present invention unless it deviates from the spirits of the invention.

Figure 7:
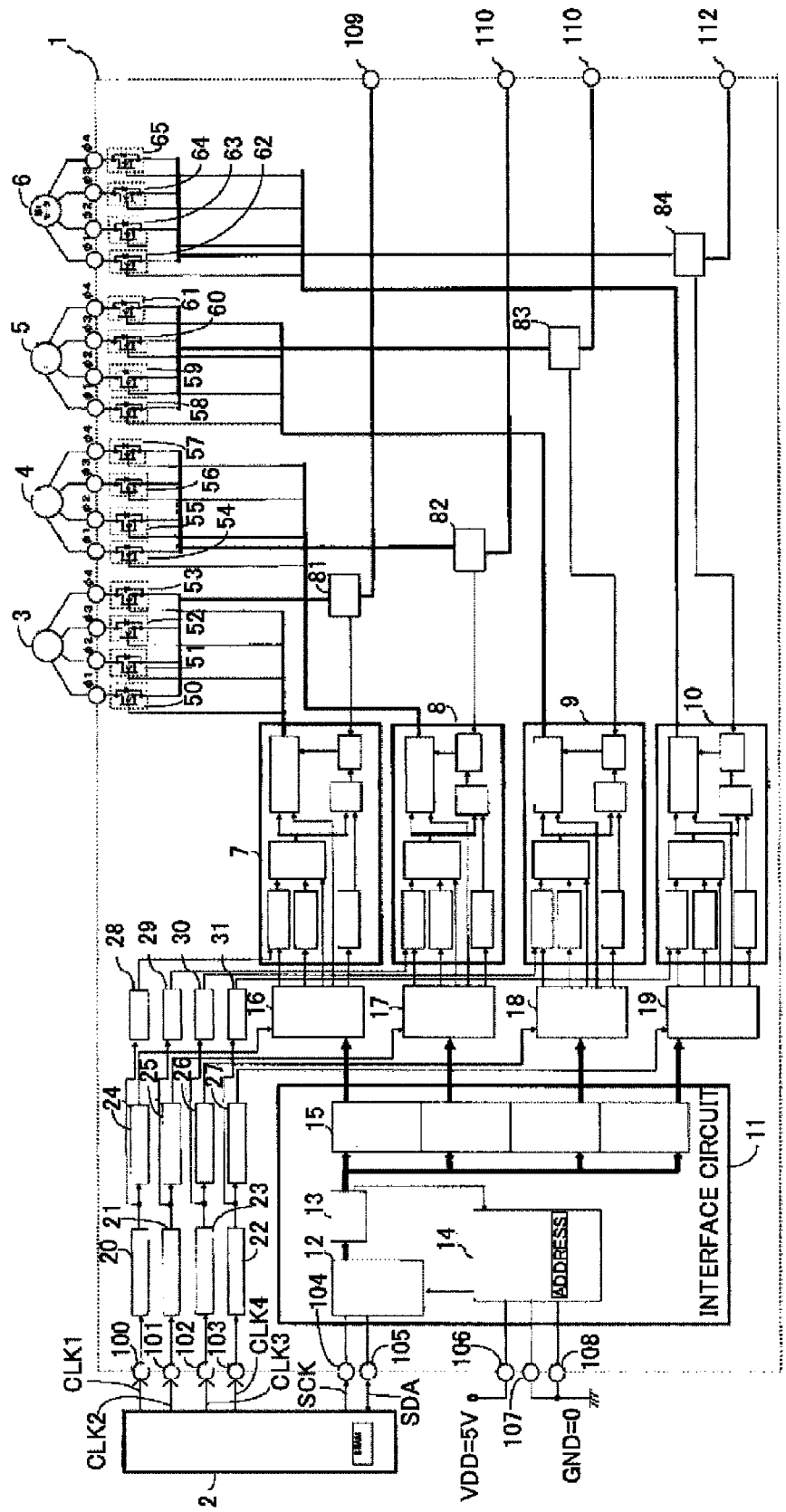
FIG. 7 is a block diagram showing a structure of a motor control circuit according to another embodiment of the present invention.

For example, the motor driver circuit 1 shown in FIG. 1 includes two driver circuits 7 and 8, but the present invention can also be applied to the case having three, four, or more built-in driver circuits in the same manner as mentioned above. FIG. 7 shows the case in which four motor driver circuits 7, 8, 9, and 10 are provided. In this case, needless to say, in the same manner as in the first embodiment shown in FIG. 1, four excess current circuits 39, an overheat detection circuit 41, a thermistor 42, an order detection circuit 43, an A/D converter 44, a control circuit 45, and a memory 46 (nonvolatile memory) are added to the circuit shown in FIG. 7 to identify which motor driver caused abnormality among the four motor drivers 7, 8, 9, and 10, although these elements are not illustrated in FIG. 7.

Even in the case where four motor driver circuits are provided, it is sufficient to prepare a single unique address value in the address matching detection circuit. Since the operation of the case is essentially the same as in the first embodiment, the detail explanation will be omitted by allotting the same and corresponding reference numerals.

As described above, according to the present invention, even if the number of motor driver circuits increases, it is possible to cope with the increased number of motor driver circuit by simply increasing the capacity of the register, eliminating the necessity of providing new external terminals, which realize an effective motor control.

BROAD SCOPE OF THE INVENTION

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein. While illustrative embodiments of the invention have been described herein, the present invention is not limited to the various preferred embodiments described herein, but includes any and all embodiments having equivalent air filter elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as a non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example."

What is claimed is:

1. A motor control circuit for controlling driving of a plurality of motors, comprising:
   a plurality of motor driver circuits for controlling driving of the plurality of motors;
   a plurality of excess current detection circuits each for detecting an excess current flowing through corresponding one of the plurality of motors to determine which motor driver circuit among the plurality of motor driver circuits caused the excess current; and
   a memory configured to receive a detection result from the plurality of excess current detection circuits and store information on which motor driver circuit among the plurality of motor driver circuits caused the excess current.

2. The motor control circuit as recited in claim 1, wherein the memory is a nonvolatile memory.

3. The motor control circuit as recited in claim 1, further comprising a plurality of current-voltage conversion circuits each for converting a current flowing through corresponding one of the plurality of motors to a voltage value,
   wherein each of the plurality of excess current detection circuits is configured to compare corresponding one of a plurality of detection voltage values outputted from the plurality of current-voltage conversion circuits with a first reference voltage value to detect an excess current flowing through corresponding one of the plurality of motors to thereby detect which motor driver circuit caused the excess current.

4. The motor control circuit as recited in claim 3, further comprising:
   a resistor which decreases in resistance value as a temperature thereof increases;
   an overheat detection circuit configured to detect overheating of the plurality of motors by comparing a second voltage obtained by passing a constant current through the resistor with a second reference voltage; and
   an order detecting circuit configured to receive detection results from the excess current detection circuits and the overheat detection circuit to thereby detect which detection result changed first,
   wherein the memory stores information on which motor driver caused the excess current or the overheating.

5. The motor control circuit as recited in claim 4, wherein the resistor is a thermistor.

6. The motor control circuit as recited in claim 4, wherein the resistor is a bandgap element.

7. The motor control circuit as recited in claim 4, further comprising:
   an A/D converter configured to convert converted voltage values obtained by the plurality of current-voltage conversion circuits into digital values, wherein the digital values are stored in the memory when one of the plurality of excess current detection circuits detected the excess current.

8. The motor control circuit as recited in claim 4, wherein the motor driver has a phase advance counter and a counter value of the phase advance counter is stored in the memory.

9. The motor control circuit as recited in claim 4, further comprising a serial communication circuit for conducting serial communicates with an outside,
wherein the serial communication circuit is configured to output values stored in the memory to the outside.

10. A motor control circuit for controlling driving of a plurality of motors, comprising:
a plurality of motor driver circuits for controlling driving of the plurality of motors;
a plurality of excess current detection circuits each for detecting an excess current flowing through corresponding one of the plurality of motors; and
a memory configured to store detection results from the plurality of excess current detection circuits so that the motor driver circuit caused the excess current can be determined.

11. The motor control circuit as recited in claim 10, further comprising a plurality of current-voltage conversion circuits each for converting a current flowing through corresponding one of the plurality of motors to a voltage value,
wherein each of the plurality of excess current detection circuits is configured to compare corresponding one of a plurality of detection voltage values outputted from the plurality of current-voltage conversion circuits with a first reference voltage value to detect an excess current flowing through corresponding one of the plurality of motors to thereby detect which motor driver circuit caused the excess current.

12. The motor control circuit as recited in claim 11, further comprising:
a resistor which decreases in resistance value as a temperature thereof increases;
an overheat detection circuit configured to detect overheating of the plurality of motors by comparing a second voltage obtained by passing a constant current through the resistor with a second reference voltage; and
an order detecting circuit configured to receive detection results from the excess current detection circuits and the overheat detection circuit to thereby detect which detection result changed first,
wherein the memory stores information on which motor driver caused the excess current or the overheating.

13. The motor control circuit as recited in claim 12, further comprising:
an A/D converter configured to convert converted voltage values obtained by the plurality of current-voltage conversion circuits into digital values,
wherein the digital values are stored in the memory when one of the plurality of excess current detection circuits detected the excess current.

\* \* \* \* \*